(12) United States Patent
Maejima et al.

(10) Patent No.: US 6,559,568 B2
(45) Date of Patent: May 6, 2003

(54) MAGNETIC BEARING TYPE VACUUM PUMP

(75) Inventors: Yasushi Maejima, Chiba (JP); Masayoshi Takamine, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 10/068,833

(22) Filed: Feb. 6, 2002

(65) Prior Publication Data

US 2002/0113509 A1 Aug. 22, 2002

(30) Foreign Application Priority Data

Feb. 19, 2001 (JP) ........................... 2001-041076

(51) Int. Cl.[7] ................................................ H02K 7/09
(52) U.S. Cl. ....................................................... 310/90.5
(58) Field of Search ................................. 310/90.5, 90

(56) References Cited

U.S. PATENT DOCUMENTS 4,717,315 A * 1/1988 Miki et al. .................. 417/365
6,166,469 A * 12/2000 Osama et al. ............... 310/90.5

FOREIGN PATENT DOCUMENTS

| DE | 4220015 | 12/1993 |
|---|---|---|
| DE | 19548664 | 6/1997 |
| DE | 19931401 | 1/2000 |
| EP | 0982500 | 3/2000 |
| EP | 1041287 | 10/2000 |
| EP | 1041288 | 10/2000 |

* cited by examiner

Primary Examiner—Nestor Ramirez
Assistant Examiner—Guillermo Perez
(74) Attorney, Agent, or Firm—Adams & Wilks

(57) ABSTRACT

To provide a magnetic bearing type vacuum pump, which can suppress the generation of eddy current on a shaft to be small in heat generation on the shaft and to be excellent in efficiency. In a shaft, an electromagnet target composing a target for electromagnets composing a radial magnetic bearing portion, a radial sensor target composing a target for a coil detecting a displacement of the shaft in the vicinity of the magnetic bearing portion and a collar between the electromagnet target and the radial sensor target are composed of laminated steel plates, so that the generation of eddy current caused on the shaft due to magnetic field generated in the magnetic bearing portion is reduced.

21 Claims, 2 Drawing Sheets

THE DOTTED CIRCLE PORTION IS CANCELLED

MAGNETIC BEARING TYPE VACUUM PUMP

BACKGROUND OF THE INVENTION

1. Field of the Invention

The present invention relates to a magnetic bearing type vacuum pump, and more particularly, to a turbo molecular pump used for exhausting gas in a semiconductor manufacturing apparatus.

2. Description of the Related Art

With the recent abrupt innovation of industrial and scientific technologies, a demand on a vacuum apparatus realizing a high vacuum environment has been increased.

For this reason, various vacuum pumps have been developed to be adopted for respective purposes. Requirements for various performances to be possessed in these vacuum pumps, such as an exhaust quantity per unit time, a vacuum degree to be reached, and suppression of vibrations, have also been made severe from year to year.

Since a magnetic bearing type turbo molecular pump meets these various performance and is highly reliable, it is widely used in exhaust for a semiconductor manufacturing apparatus, in exhaust for a vacuum pump of a scientific and scientific technique study.

The magnetic bearing type turbo molecular pump is designed to magnetically float a shaft by using electromagnets, and to maintain the shaft in a levitated state in a non-contact manner. Therefore, a lubricating oil is not required in bearing portions, and thus there is no fear that the lubricating oil gets mixed in the inside of the vacuum apparatus. Further, it is almost completely free from problems of friction, wearing, noise, etc., and further it can rotate the shaft at a high speed.

Hereafter, a structure of the magnetic bearing type turbo molecular pump will be discussed briefly.

The magnetic bearing type turbo molecular pump is composed of a substantially cylindrical casing, a stator and a rotor housed in the casing, etc.

The stator is formed in an inner circumferential surface of the casing, which has a plurality of stator blades arranged in multiple stages and extending toward a center direction of the casing.

A shaft is rotatably held on a central axis of the casing. The shaft is axis-supported by magnetic bearings fixed to the stator so as to be rotatable at a high speed by a motor portion formed in the substantially central portion of the shaft.

A suction port is formed in one end of the casing, and a rotor is attached to a suction port side portion of the shaft.

A plurality of radially arranged rotor blades are attached around the rotor in multiple stages. The stages of the rotor blades and the stages of the stator blades are alternately positioned.

When the shaft is rotated at a high speed by the motor, the rotor blades are rotated with this rotation. When the rotor blades are rotated, by the action of the rotor blades and the stator blades, the turbo molecular pump sucks gas through the suction port, and exhausts the gas through an exhaust port formed in the casing.

FIG. 4 shows a magnetic bearing portion, a shaft, and their peripheral portion in a conventional magnetic bearing type turbo molecular pump.

The magnetic bearing portion is composed of four electromagnets 130 disposed around a shaft 111 with predetermined clearances therebetween.

The electromagnets 130 are distributed at an angular interval of 90 degrees around the shaft 111 to be confronted therewith. On the other hand, a portion of the shaft confronted with the electromagnets 130 is formed into an electromagnet target 129. The electromagnet target 129 is constructed such that ring-like steel plates, the surfaces of which are made insulated, are passed through and fixed to the shaft 111.

The electromagnets 130 attract the electromagnet target 129 by magnetic force to magnetically float or levitate the shaft 111 in the radial direction and to hold it in a non-contact manner.

Since laminated steel plates composing the electromagnet target 129 are insulated one from another, eddy currents induced on the surface of the shaft 111 by magnetic fields generated by the electromagnets 130 cannot flow across the plurality of laminated steel plates.

For this reason, the loss of eddy currents, the heat generated on the shaft 111 by the eddy currents, and the like can be suppressed.

A coil 128 of a radial sensor is provided in the vicinity of the magnetic bearing portion and spaced from the shaft 111 at a predetermined clearance. On the other hand, a surface of the shaft 111 confronted with the coil 128 is formed into a radial sensor target 136 composed of laminated steel plates.

The coil 128 is a part of an oscillating circuit formed in a control portion installed outside the turbo molecular pump.

When the oscillating circuit is oscillated, a high frequency current flows through the coil 128 with the oscillation so that the coil 128 generates a high frequency magnetic field on the shaft 111.

If a distance between the coil 128 and the radial sensor target 136 is varied, the oscillating width of the oscillator is varied and thus the displacement of the shaft 111 can be detected.

A collar 135, made of metal, such as a stainless steel, is formed between the radial sensor target 136 of the shaft 111 and the electromagnet target 129 thereof. Since the collar 135 and the electromagnets 130 are located closely, the magnetic field 134 generated when the electromagnets 130 is excited can also permeate through the collar 135.

However, since the collar 135 does not have eddy current preventing means made, for instance, by laminated steel plates, not only the collar 135 is heated by the eddy current generated by the magnetic field 134, but also there is wasteful electric power consumption due to the loss of the eddy current. Further, if the eddy current is generated in the collar 135, this eddy current applies, onto the shaft 111, a force in a direction braking the rotation.

Accordingly, an object of the present invention is to provide a magnetic bearing type vacuum pump, which can suppress the generation of the eddy current on the shaft to be small in heat generation on the shaft and to be excellent in efficiency.

SUMMARY OF THE INVENTION

According to the present invention, in order to attain the above objects, there is provided a magnetic bearing type vacuum pump characterized by comprising: a substantially cylindrical casing formed with a suction port and an exhaust port; a stator formed within the casing; a shaft axis-supported by the stator to be rotatable; a rotor attached to the shaft to be rotated together with the shaft; a motor for driving and rotating the shaft; a magnetic bearing portion including a plurality of electromagnets disposed around a predetermined portion of the shaft with a predetermined gap from the shaft, and an electromagnet target formed on a portion of the shaft confronted with the electromagnets; a radial sensor portion disposed in the vicinity of the magnetic bearing portion, and including a radial sensor disposed around the shaft with a predetermined gap therefrom, and a radial sensor target formed on a portion of the shaft confronted with the radial sensor; and a thrust bearing portion for holding the shaft in a thrust direction, in which laminated steel plates laminated through insulation are formed on the shaft between the electromagnet target and the radial sensor target (first structure).

The laminated steel plate portion in a first structure can include the steel plates laminated in an axial direction of the shaft (second structure).

The electromagnet target and the radial sensor target in a first or a second structure can be formed of laminated steel plates, and the laminated steel plate portion can be integrally formed with the electromagnet target and the radial sensor target (third structure).

Further, the steel plate in any one of first to third structures can include a silicon steel plate (forth structure).

Also, the magnetic bearing pump in any one of first to forth structures can be composed of a turbo molecular pump having rotor blades on the rotor and stator blades on the stator, a threading groove type pump with threading groove formed on at least one of the rotor and the stator, or a magnetic bearing type vacuum pump having the turbo molecular pump in the suction portion side and the threading groove type pump in the exhaust port side.

DESCRIPTION OF THE PREFERRED EMBODIMENT

Hereinafter, a preferred embodiment of the present invention will be described in detail with reference to FIGS. 1 to 3. Note that in the present embodiment, the invention will be discussed using a turbo molecular pump as an example of a magnetic bearing type vacuum pump.

Figure 1:
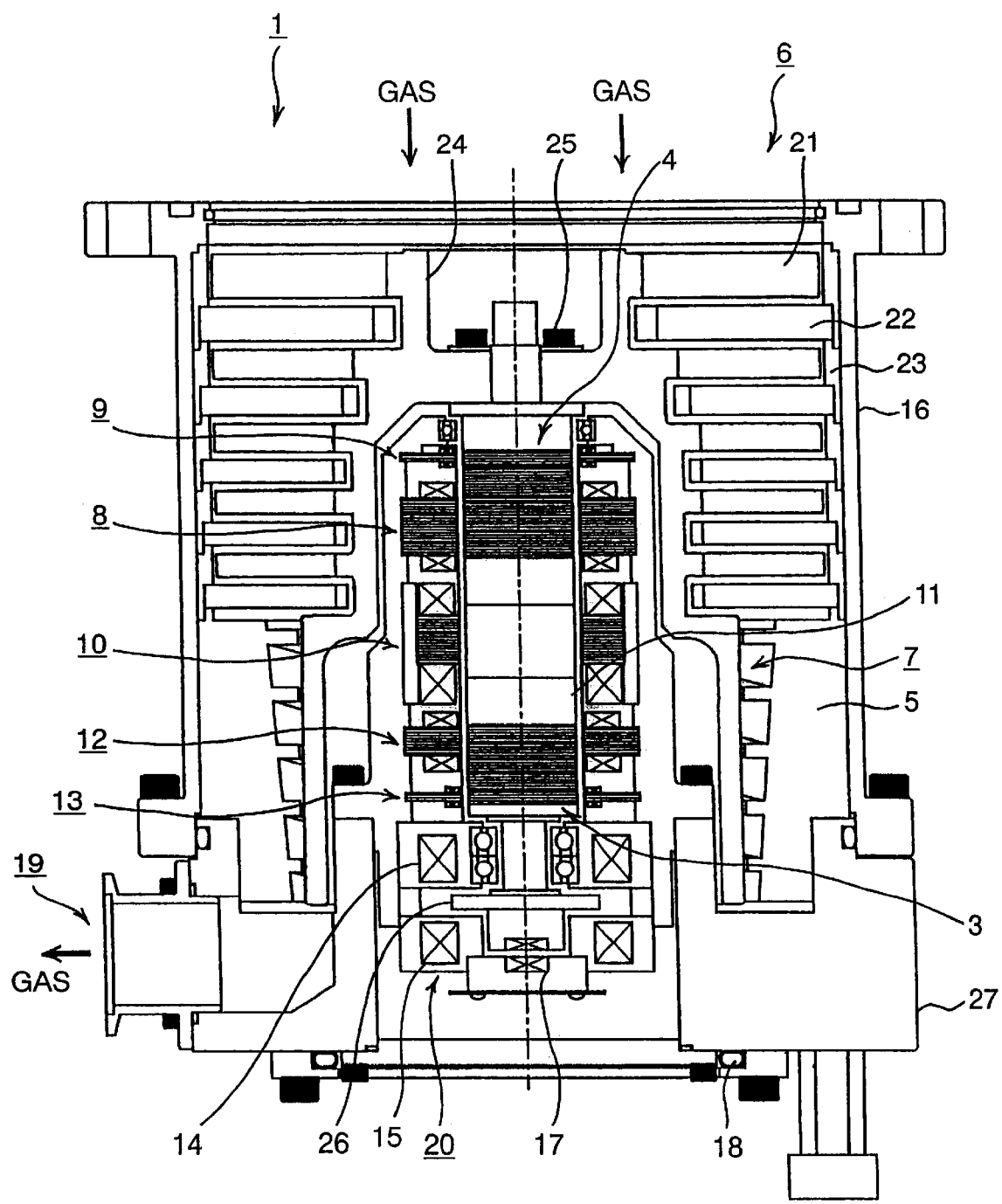
FIG. 1 is a sectional view showing a structure of a turbo molecular pump.

FIG. 1 is a view showing a turbo molecular pump 1 according to the present embodiment, which is a sectional view in an axial direction of a shaft 11.

In addition, although not shown in FIG. 1, for example, a suction port 6 of the turbo molecular pump 1 is connected to a vacuum apparatus, such as a semiconductor manufacturing apparatus, via a conductance valve (a valve that varies a cross sectional area of a flow passes of a pipe to adjust a conductance, i.e., a flowability, of an exhaust gas), and an exhaust port 19 is connected to an auxiliary pump.

A casing 16 forming an outer housing of the turbo molecular pump 1 has a cylindrical form, and the shaft 11 is installed on a center thereof. The casing 16 forms the outer housing of the turbo molecular pump 1 in cooperation with a base 27 to be described below.

Magnetic bearing portions 8, 12 and 20 are provided at an upper portion, a lower portion and a bottom portion of the shaft 11 in the axial direction, respectively. The shaft 11 is held by the magnetic bearing portions 8 and 12 in a radial direction (in the radial direction of the shaft 11) in a non-contact manner, and held by the magnetic bearing portion 20 in a thrust direction (an axial direction of the shaft 11) in a non-contact manner. These magnetic bearing portions compose a so-called five-axes control type magnetic bearing, and the shaft 11 has only a degree of freedom of rotation about the axis.

The magnetic bearing portion 8 is composed, for instance, of four electromagnets disposed at angular intervals of 90 degrees around the shaft 11 to be confronted therewith.

On a portion of the shaft 11, extending from the magnetic bearing portion 8 to a radial sensor 9, a target 4 to be described below is formed, so that the shaft 11 is attracted by magnetic force of the electromagnets of the magnetic bearing portion 8.

The target 4 is composed of laminated steel plates in which a large number of steel plates, the surfaces of which have electrically insulative coatings, are laminated one on another in an axial direction of the shaft 11. This construction is provided to suppress the eddy current generated on the surface of the shaft 11 due to magnetic field of the electromagnets of the magnetic bearing portion 8. The detail of this construction will be described below.

As used herein, "eddy current" means a spiral current generated in a metal in accordance with the electromagnetic induction theory when a magnetic flux penetrating through the metal is moved relative to the metal.

The radial sensor 9 is an element for detecting a displacement of the shaft in the radial direction, and is composed, for example, of a coil.

This coil is a part of an oscillating circuit formed in an unillustrated control portion installed outside the turbo molecular pump 1. A high frequency current flows through the radial sensor 9 with the oscillation of the oscillating circuit so that the radial sensor 9 generates a high frequency magnetic field on the shaft 11.

When a distance between the radial sensor and the target 4 is varied, an oscillation width of the oscillator is varied, whereby the displacement of the shaft 11 can be detected.

Note that as the sensor for detecting the displacement of the shaft 11, other types, such as capacity type and optical type, are available.

When the control portion detects the displacement of the shaft 11 in the radial direction based on a signal from the radial sensor 9, the control portion adjusts the magnetic force of each electromagnet of the magnetic bearing portion 8 so that the shaft 11 is returned to a predetermined position.

In this manner, the control portion feed-back controls the magnetic bearing portion 8 based on the signal from the radial sensor 9. This makes it possible to magnetically float the shaft 11 in the radial direction by using the magnetic bearing portion 8 with predetermined clearances from the electromagnets, and to hold it in a space in a non-contact manner.

The construction and operation of the magnetic bearing portion 12 is the same as those of the magnetic bearing portion 8.

The magnetic bearing portion 12 is composed, for example, of four electromagnets disposed at an angular interval of 90 degrees around the shaft 11.

A portion of the shaft 11, extending from the magnetic bearing portion 12 to a radial sensor 13, is formed into a target 3, which is composed of laminated steel plates, so that the shaft 11 is attracted by magnetic force of the electromagnets of the magnetic bearing portion 12.

By the attraction force of the electromagnets of the magnetic bearing portion 12, the shaft 11 is held in the radial direction by the magnetic bearing portion 12 in a non-contact manner.

The radial sensor 13 detects the displacement of the shaft 11 in the radial direction.

The control portion detects the displacement of the shaft 11 by using the radial sensor 13 to perform feed-back control for an excitation current to the electromagnets, to thereby hold the shaft 11 at a predetermined position.

This makes it possible to magnetically float the shaft 11 in the radial direction by using the magnetic bearing portion 12, and to hold it in a space in a non-contact manner.

The magnetic bearing portion 20 provided at the lower end of the shaft 11 is composed of a circular plate-like metal disk 26, electromagnets 14 and 15 and a thrust sensor 17.

The metal disk 26 is made of material high in magnetic permeability, such as iron, and is fixed at its center to the shaft 11 perpendicularly. The electromagnet 14 is installed above the metal disk 26, and the electromagnet 15 is installed below the metal disk 26. The electromagnet 14 upwardly attracts the metal disk 26 through magnetic force, and the electromagnet 15 downwardly attracts the metal disk 26.

When the magnetic forces applied to the metal disk 26 by the electromagnets 14 and 15 are adjusted properly, the shaft 11 can be floated in the thrust direction and held in a space in a non-contact manner.

The thrust sensor 17 is composed, for example, of a coil similarly to the radial sensors 9 and 13, to detect the displacement of the shaft 11 in the thrust direction and feed the detection signal to the unillustrated control portion.

The control portion can detect the displacement of the shaft 11 in the thrust direction upon reception of the signal fed from the radial sensor 13.

When the shaft 11 is moved upwardly or downwardly to be displaced from a predetermined position in the thrust direction, the control portion adjusts excitation currents to the electromagnets 14 and 15 to correct this displacement and to return the shaft 11 to a predetermined position.

Under this feed-back control, the control portion can magnetically float the shaft 11 at the predetermined position in the thrust direction to hold it.

As described above, the shaft 11 is held in the radial direction by the magnetic bearing portions 8 and 12, and held in the thrust direction by the magnetic bearing portion 20, thereby being rotated about the axis.

A motor portion 10 is formed in a middle of the shaft 11 between the magnetic bearing portions 8 and 12.

In the present embodiment, a DC brush-less motor is employed as an example of the motor portion 10.

A permanent magnet is fixed around a portion of the shaft 11 composing the motor portion 10. This permanent magnet is fixed, for example, such that an N pole and an S pole are disposed at an angular interval of 180 degrees around the shaft 11. For example, six electromagnets are disposed at an angular interval of 60 degrees around this permanent magnet with predetermined clearances from the shaft 11 to be symmetric with respect to the axis of the shaft 11 and to be confronted therewith.

On the other hand, the turbo molecular pump 1 is provided with an unillustrated sensor for detecting a rotational frequency and a rotational angle (a phase) of the shaft 11, whereby the control portion can detect a position of the magnetic pole of the permanent magnet fixed to the shaft 11.

The control portion sequentially switches currents to the electromagnets of the motor portion 10 in accordance with the detected position of the magnetic pole, to thereby generate the rotational magnetic field around the permanent magnet of the shaft 11.

The permanent magnet fixed to the shaft 11 follows this rotational magnetic field, and thus shaft 11 is rotated.

A rotor 24 is attached to the upper end of the shaft 11 with a plurality of bolts 25.

The turbo molecular pump 1 of the present embodiment is composed, as an example, such that a portion of the rotor 24 from a substantially middle thereof to a suction port 6 side, that is, the substantially upper half portion in the drawing, is composed of a molecular pump portion including rotor blades and stator blades (hereinafter referred to as the turbo molecular pump portion), and the substantially lower half portion in the drawing is composed of a molecular pump portion in the form of a threading groove type pump (hereinafter referred to as the threading groove pump portion). Note that the structure of the turbo molecular pump should not be limited to this, and a molecular pump composed of the rotor blades and stator blades from the suction port 6 side to the exhaust port 19 side, or of the threading grooves or having other structure may be used.

In the turbo molecular pump portion located in the suction port 6 side of the rotor 24, the rotor blades 21 made of aluminum alloy or the like are attached in a plurality of stages to extend radially from the rotor 24 with inclination at a predetermined angle with respect to a plane perpendicular to the axis of the shaft 11. The rotor blades 21 are fixed to and axially spaced along the rotor 24 to be rotated at high speed together with the shaft 11.

In the suction port side of the casing 16, the stator blades 22 made of aluminum alloy or the like are axially spaced from one another and are disposed to be inclined at a predetermined angle with respect to the plane perpendicular to the axis of the shaft 11, to be directed inwardly of the casing 16 and to be arranged alternately and interleaved with respect to the stages of the rotor blades 21.

Spacers 23 are ring-like members, made of metal, such as aluminum, iron and a stainless steel.

Each spacer 23 is formed between the respective stages formed by the stator blades 22 to hold the stator blades 22 at predetermined positions.

When the rotor 24 is driven by the motor portion 10 to be rotated together with the shaft 11, the exhaust gas is sucked through the suction portion 6 by the action of the rotor blades 21 and the stator blades 22.

The exhaust gas sucked through the suction port 6 is passed through gaps between the rotor blades 21 and the stator blades 22 to be fed to the threading groove pump portion.

The threading groove pump portion is composed of the rotor 24 and a threading groove spacer 5.

The threading groove spacer 5 is a cylindrical member made of a metal such as aluminum, stainless steel and iron, and a plurality of spiral threading grooves 7 in plural sets are formed at its inner circumferential surface.

The spiral direction of the threading grooves 7 is a direction in which molecules of the exhaust gas are carried toward the exhaust port 19 when the molecules are moved in the rotational direction of the rotor 24.

The outer circumferential surface of the rotor 24 is formed to be cylindrical in the threading groove pump portion.

Further, the outer circumferential surface of the rotor 24 is protruded toward the inner circumferential surface of the threading groove spacer 5 so as to be close to the inner circumferential surface of the threading groove spacer 5 with a predetermined clearance.

When the rotor 24 is driven by the motor portion 10 to be rotated, the exhaust gas fed from the turbo molecular pump portion is guided by the threading grooves 7 to be carried toward the exhaust port 19.

Note that although in the present embodiment the threading groove spacer with the threading grooves 7 formed is disposed in the stator side and the outer circumferential surface of the rotor 24 is formed to be cylindrical, reversely threading grooves may be formed in an outer circumferential surface of the rotor and a spacer having a cylindrical inner circumferential surface may be disposed around the outer circumferential surface.

The base 27 is a disk like member forming a base portion of the turbo molecular pump 1, and is made of a metal such as stainless steel, aluminum and iron.

The casing 16 is jointed to the upper end portion of the outer peripheral portion of the base 27, and the threading groove spacer 5 is disposed in the inside thereof. At the central portion, mechanisms for holding the shaft 11 such as the magnetic bearing portions 8, 12 and 20 and the motor portion 10 are installed.

A water-cooling tube 18 for circulating a cooling water is attached to a lower portion of the base 27 so that heat exchange is efficiently conducted between the water-cooling tube 18 and the base 27. The heat transmitted to the base 27 can be efficiently released to an exterior of the turbo molecular pump 1 by the cooling water circulating inside the water-cooling tube 18, thereby preventing the turbo molecular pump 1 from being heated beyond a permissible temperature.

The water-cooling tube 18 constitutes a water-cooling system in cooperation with an un-illustrated water feeding pump and an unillustrated head exchange unit. By the action of the water feeding pump, the cooling water within the water-cooling tube 18 is circulated in the water-cooling system.

Further, the heat obtained by the heat exchange with the base 27 is released by the heat exchange unit to the outside of the water-cooling system, such as the atmosphere.

As a result, the cooling water is cooled, and fed again to the turbo molecular pump 1 by the water-feeding pump.

Figure 2:
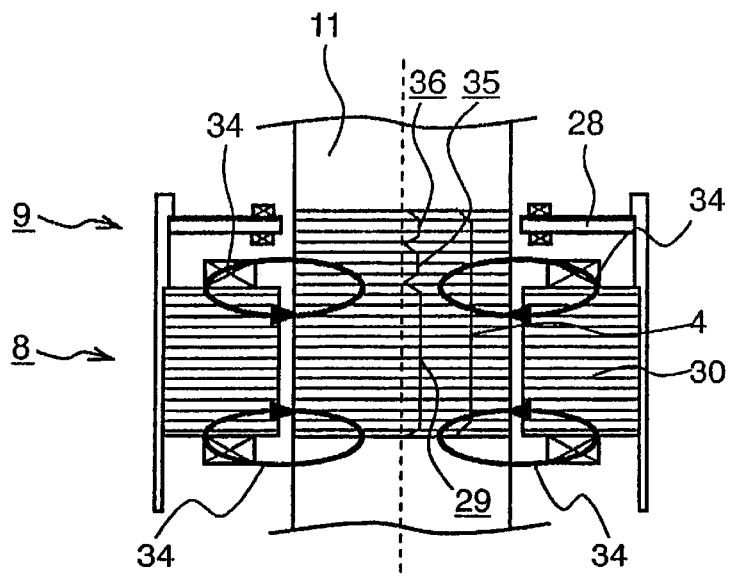
FIG. 2 is a view showing a magnetic bearing portion and the vicinity thereof of the turbo molecular pump.

FIG. 2 is a view showing the magnetic bearing portion 8 and its peripheral portion in detail.

The electromagnets 30 of the magnetic bearing portion 8 and the coil 28 composing the radial sensor 9 are disposed at predetermined clearances from the shaft 11.

On a region on the shaft 11, ranging from the magnetic bearing portion 8 to the radial sensor 9, the target portion 4 composed of the laminated steel plates is formed.

The target 4 is composed of an electromagnet target 29 confronted with the electromagnets 30, a radial sensor target 36 confronted with the coil 28 and a collar 35 located between the electromagnet target 29 and the radial sensor target 36.

Each of the steel plates laminated on the target 4 is a ring-like, steel-made thin plate, the surface of which an electrically insulative coating is formed on.

The outer diameter of the portion of the shaft 11 where the target 4 is formed is set to be substantially equal to the inner diameter of the steel plates. The ring of the steel plates is fixed to the shaft 11 by shrinkage fit.

That is, at the time of mounting the steel plates, the steel plates are heated to increase the inner diameter, and then mounted to the shaft, and thereafter the steel plates are cooled to decrease the inner diameter, to thereby make the shaft 11 and the steel plates interference fit and fix the steel plates onto the shaft 11.

As described above, the steel plates are laminated in the axial direction of the shaft 11. The layers formed by these steel plates are high in interlayer resistance because of the presence of the insulative coatings formed on the surfaces of the steel plates.

The electromagnets 30, when supplied with excitation current, generate the magnetic field 34. The magnetic field 34 permeates through the shaft 11, and induces the eddy current on the surface of the shaft 11 in accordance with the electromagnetic induction theory.

However, since the laminated steel plates composing the target 4 are insulated one from another by the insulative coatings, no eddy current flows in the interlayer direction. For this reason, it is possible to reduce the heat generated on the shaft due to the generation of the eddy current and the loss of electric power due to the eddy current loss.

Further, in the present embodiment, since the collar 35 is also composed of the laminated steel plates, it is possible to suppress the eddy current which is conventionally generated in the collar 35 due to the magnetic field of the electromagnets 30.

Note that the magnetic field generated by the coil 28 is small in comparison with the magnetic field generated by the electromagnets 30, and therefore is not illustrated.

Figure 3:
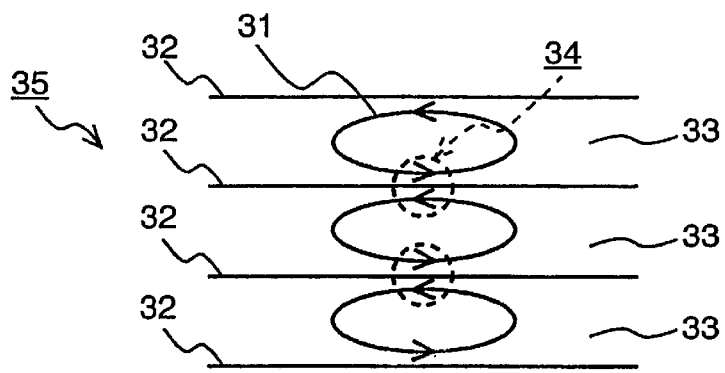
FIG. 3 is a view showing a collar of the magnetic bearing portion in an enlarged manner.

FIG. 3 is a view showing the surface of the collar 35 in an enlarged manner.

The steel plates 33 are laminated with the electrically insulative coatings 32 interposed therebetween. The up and down direction on the paper plane corresponds to the axial direction of the shaft 11.

The steel plate 33 is, for example, a silicon steel plate containing a silicon about 4% and having a thickness of 0.35 mm. On the surface of the steel plate 33, the insulative coating 32 is formed so that the adjacent laminated steel plates 33 are insulated from each other. The steel plate 33 is the same kind as a silicon steel plate material generally used in an iron core of a transformer.

In the collar 35, the eddy currents 31 are generated due to the influence of the magnetic field generated by the electromagnets 30 and the coil 28.

The eddy currents occur in the respective laminated steel plates 33 since the laminated steel plates 33 are insulated one from another by the insulative coatings 32. Consequently, no large eddy current occurs over the steel plates 33.

Since the steel plates 33 are located close to each other, the magnetic flux penetrating through the adjacent steel plates becomes substantially identical to each other. For this reasons the eddy currents 31 generated in the adjacent steel plates 33 are substantially the same in direction and magnitude.

Therefore, in the adjacent region 34 between two adjacent steel plates 33, the portions of the eddy currents 31 generated along the insulative coating 32 have, in the adjacent steel plates 33, the same current value and the opposite current direction with respect to the above-mentioned current, and consequently the eddy currents 31 are canceled by each other in the adjacent region 34.

For this reason, in the collar 35 as a whole, the eddy currents generated in the axial direction the shaft 11 are cancelled.

In general, an eddy current generated in a metal occurs to hinder a change of the magnetic flux penetrating through the metal. Therefore, if the eddy current is generated in the shaft 11, a force serving to brake the shaft 11 is generated.

Further, if the eddy current is generated in the shaft 11, the heat is generated due to the electric resistance possessed by the shaft 11. Therefore, the heat is generated in the shaft, and at the same time, the electric power supplied to the turbo molecular pump 1 is consumed for the generation of heat of the shaft 11.

Therefore, by constructing the collar 35 with the laminated steel plates to suppress eddy currents generated in the collar 35, it is possible to suppress the braking force, the generation of heat and the electric power loss occurring in the collar 35.

Figure 4:
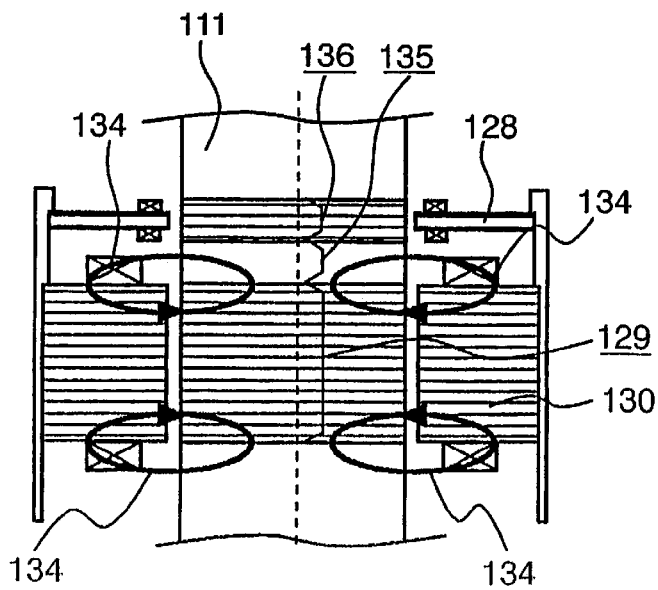
FIG. 4 is a view showing a conventional magnetic bearing portion and the vicinity thereof of the turbo molecular pump.

Conventionally, as shown in FIG. 4, the electromagnet target 129 and the radial sensor 136 are formed by laminated steel plates, and the collar 135 is composed of a metal, such as a stainless steel.

By way of contrast, in the present embodiment, the electromagnet target 29, the collar 35 and the radial sensor target 36 are formed integrally by the laminated steel plates. For this reason, the structure can be made simple, and the number of kinds of component can be decreased, whereby the manufacturing cost can be reduced.

The foregoing description has been directed to the target 4 corresponding to the magnetic bearing portion 8 and the radial sensor 9. The structure of the target 3 formed in the portion corresponding to the magnetic bearing portion 12 and the radial sensor 13 is the same as that of the target 4. That is, the target 3 is constructed by the laminated steel plates as the integral component, which corresponds to a part from the magnetic bearing portion 12 to the radial sensor 13.

Although in the present embodiment the rings of the steel plates are fastened to the shaft 11 by the shrinkage fit, the fastening method to the shaft 11 is not limited to this, and the laminated steel plates may be fixed by bolts disposed to exert the fastening force in the axial direction of the shaft 11.

The turbo molecular pump 1 constructed as mentioned above is operated as follows:

First of all, the magnetic bearing portions 8, 12 and 20 are driven to magnetically float the rotor shaft 11.

The displacement of the shaft 11 in the radial direction is detected by the radial sensors 9 and 13, and the displacement of the shaft 11 in the thrust direction is detected by the thrust sensor 17. The unillustrated control portion performs feedback control for the excitation currents supplied to the electromagnets of the magnetic bearing portions 8, 12 and 20 based on the detected displacement of the shaft 11 to hold the shaft 11 at the predetermined position.

Next, the control portion drives the motor 10 to rotate the shaft 11, the rotor 24 and the rotor blades 21 at high speed.

Consequently, by the action of the rotor blades 21 and the stator blades 22, the process gas is sucked through the suction port 6 into the turbo molecular pump portion.

The process gas sucked into the turbo molecular pump portion is fed to the threading groove pump portion.

The process gas fed to the threading groove pump portion is carried along the threading grooves 7 by the rotation of the rotor 24 to be exhausted through the exhaust port 19 to the exterior of the turbo molecular pump 1.

During operation of the turbo molecular pump 1, the control portion detects the displacement of the shaft 11 using the magnetic bearing system which includes the radial sensors 9 and 13 and the thrust sensor 17 to adjust the magnetic forces of the magnetic bearing portions 8, 12 and 20 acting on the shaft 11.

At this time, the magnetic fluxes penetrating through the targets 3 and 4 are varied, but since the targets 3 and 4 are composed of the laminated steel plates insulated one from another, the generation of the eddy currents by the magnetic bearing portions 8 and 12 are suppressed. Accordingly, during the activation of the turbo molecular pump 1, the generated heat, the generation of the braking force and electric power loss, etc. of the targets 3 and 4 including the collars, which are caused by the eddy currents, can be suppressed to a minimal level.

As described above, in the turbo molecular pump 1 according to the present embodiment, each of the targets 3 and 4, including the collar, is formed by the integral, laminated steel plates. Therefore, it is possible to suppress the eddy currents caused by the magnetic field, which is generated by the magnetic bearing portions 8 and 12 and the radial sensors 9 and 13, penetrating through the shaft 11, thereby capable of reducing the generated heat of the shaft, the generation of braking force and the electric power loss stemming from the eddy currents.

Further, the manufacturing cost for the targets 3 and 4 can be lowered in comparison with related products.

Although in the present embodiment, the turbo molecular pump 1 is constructed as the turbo molecular pump including the turbo molecular pump portion and the threading groove pump portion, the present invention is not limited to this. The present invention is applicable to a target in which the shaft is held by a magnetic bearing, such as a turbo molecular pump which is composed of the turbo molecular pump portion without having the threading groove pump portion.

According to the present invention, it is possible to provide a magnetic bearing type vacuum pump in which heat of a shaft due to eddy current is small and loss of electric power due to the eddy current is reduced.

What is claimed is:

1. A magnetic bearing type vacuum pump comprising:
    a cylindrical casing having a suction port and an exhaust port;
    a stator disposed within the casing;
    a shaft rotatably supported within the casing;
    a rotor attached to the shaft to be rotated together with the shaft;
    a motor for rotationally driving the shaft;
    a magnetic bearing portion including a plurality of electromagnets disposed around a predetermined portion of the shaft with a predetermined gap from the shaft, and an electromagnet target formed on a portion of the shaft confronted with the electromagnets;
    a radial sensor portion disposed in the vicinity of the magnetic bearing portion and including a radial sensor disposed around the shaft with a predetermined gap therefrom, and a radial sensor target formed on a portion of the shaft confronted with the radial sensor;
    a thrust bearing portion for holding the shaft in a thrust direction; and
    a collar disposed on the shaft between the electromagnet target and the radial sensor target, the collar being formed of laminated steel plates laminated through insulations.

2. A magnetic bearing type vacuum pump according to claim 1, wherein the laminated steel plates are laminated in an axial direction of the shaft.

3. A magnetic bearing type vacuum pump according to claim 1, wherein the electromagnet target and the radial sensor target are formed of laminated steel plates integrally formed with the laminated steel plates of the collar.

4. A magnetic bearing type vacuum pump according to claim 1, wherein the steel plates are composed of silicon steel.

5. A magnetic bearing type vacuum pump according to claim 1, wherein the magnetic bearing pump comprises one of a turbo molecular pump having rotor blades on the rotor and stator blades on the stator, a threading groove type pump with a threading groove formed on at least one of the rotor and the stator, or a magnetic bearing type vacuum pump having a turbo molecular pump in the suction port side and a threading groove type pump in the exhaust port side.

6. A magnetic bearing type vacuum pump according to claim 1, wherein the motor, the magnetic bearing portion and the radial sensor poriton are disposed axially along the shaft, the magnetic bearing portion being disposed between the radial sensor portion and the motor.

7. A magnetic bearing type vacuum pump according to claim 1, wherein the shaft extends axially through the interior of the rotor and is connected to the rotor at one end portion of the casing.

8. A magnetic bearing type vacuum pump comprising: an upstanding casing having axially spaced-apart opposite ends, a suction port and an exhaust port; a stator disposed in the casing and having axially spaced stator blades; a rotor disposed in the casing and having axially spaced rotor blades interleaved with the stator blades; a shaft rotatably disposed within the casing and extending axially through a hollow portion of the rotor, the shaft being connected to the rotor near one end of the casing; a motor disposed in the casing for rotationally driving the shaft to thereby rotate the rotor; and a magnetic bearing system disposed in the casing for magnetically rotatably supporting the shaft in a levitated state, the magnetic bearing system including a plurality of first electromagnets disposed in angularly spaced relation around and spaced from the shaft, a first electromagnet target mounted on the shaft and confronting the first electromagnets, a first radial sensor extending around and spaced from the shaft, a first radial sensor target mounted on the shaft and confronting the first radial sensor, and a first collar mounted on the shaft between the first electromagnet target and the first radial sensor target, the first collar comprising a lamination of steel plates each coated with an electrically insulative coating to effectively suppress eddy currents generated on the surface of the shaft during operation of the magnetic bearing type vacuum pump.

9. A magnetic bearing type vacuum pump according to claim 8; wherein the steel plates are comprised of silicon steel.

10. A magnetic bearing type vacuum pump according to claim 8; wherein the first collar is integrally formed with the first electromagnet target and the first radial sensor target.

11. A magnetic bearing type vacuum pump according to claim 8; wherein the first electromagnet target and the first radial sensor target each comprise a lamination of steel plates each coated with an electrical insulative coating.

12. A magnetic bearing type vacuum pump according to claim 8; wherein the first collar, the first electromagnet target and the first radial sensor target jointly comprise an integrally formed lamination of steel plates each coated with an electrically insulative coating.

13. A magnetic bearing type vacuum pump according to claim 12; wherein the steel plates are comprised of silicon steel.

14. A magnetic bearing type vacuum pump according to claim 8; wherein the plurality of first electromagnets are disposed axially along the shaft at a location between the motor and the first radial sensor.

15. A magnetic bearing type vacuum pump according to claim 8; wherein the magnetic bearing system further incudes a plurality of second electromagnets disposed in angularly spaced relation around and spaced from the shaft, a second electromagnet target mounted on the shaft and confronting the second electromagnets, a second radial sensor extending around and spaced from the shaft, a second radial sensor target mounted on the shaft and confronting the second radial sensor, and a second collar mounted on the shaft between the second electromagnet target and the second radial sensor target, the second collar comprising a lamination of steel plates each coated with an electrically insulative coating to effectively suppress eddy currents generated on the surface of the shaft during operation of the magnetic bearing type vacuum pump.

16. A magnetic bearing type vacuum pump according to claim 15; wherein the second collar is integrally formed with the second electromagnet target and the second radial sensor target.

17. A magnetic bearing type vacuum pump according to claim 15; wherein the second electromagnet target and the second radial sensor target each comprise a lamination of steel plates each coated with an electrically insulative coating.

18. A magnetic bearing type vacuum pump according to claim 15; wherein the second collar, the second electromagnet target and the second radial sensor target jointly comprise an integrally formed lamination of steel plates each coated with an electrically insulative coating.

19. A magnetic bearing type vacuum pump according to claim 15; wherein the motor is disposed axially along the shaft at a location between the first and second electromagnets.

20. A magnetic bearing type vacuum pump according to claim 19; wherein the portion of the shaft that extends axially between the first and second electromagnet targets is free of laminations of steel plates coated with electrically insulative coatings.

21. A magnetic bearing type vacuum pump according to claim 8; wherein the motor is disposed axially along the shaft, and the portion of the shaft that extends axially along the motor is free of laminations of steel plates coated with electrically insulative coatings.

* * * * *